US008874920B2

(12) United States Patent
Amiel et al.

(10) Patent No.: US 8,874,920 B2
(45) Date of Patent: Oct. 28, 2014

(54) VERIFYING CRYPTOGRAPHIC SIGNATURE FROM STORED PRIMITIVES OF PREVIOUSLY RECEIVED SIGNATURE

(75) Inventors: Frederic P. R. Amiel, Antibes (FR); Aymeric S. Vial, Juan les Pins (FR)

(73) Assignee: Texas Instruments Incorporated, Dallas, TX (US)

( * ) Notice: Subject to any disclaimer, the term of this patent is extended or adjusted under 35 U.S.C. 154(b) by 1376 days.

(21) Appl. No.: 12/339,985

(22) Filed: Dec. 19, 2008

(65) Prior Publication Data

US 2009/0217050 A1     Aug. 27, 2009

(30) Foreign Application Priority Data

Feb. 26, 2008   (EP) ..................................... 08290175

(51) Int. Cl.
H04L 9/32 (2006.01)
G06F 21/72 (2013.01)
G06F 21/74 (2013.01)

(52) U.S. Cl.
CPC ................ *G06F 21/74* (2013.01); *G06F 21/72* (2013.01)
USPC .................... 713/176; 726/3; 726/21; 726/33; 380/277; 380/286

(58) Field of Classification Search
USPC ............ 713/176; 380/277, 286; 726/3, 21, 33
See application file for complete search history.

(56) References Cited

U.S. PATENT DOCUMENTS

| | | | | |
|---|---|---|---|---|
| 6,118,889 | A * | 9/2000 | Izuno et al. | 382/119 |
| 6,584,565 | B1 * | 6/2003 | Zamek | 713/156 |
| 7,441,115 | B2 * | 10/2008 | Miyazaki et al. | 713/156 |
| 7,890,763 | B1 * | 2/2011 | Law et al. | 713/176 |
| 8,037,312 | B2 * | 10/2011 | Takenaka et al. | 713/177 |
| 2004/0123107 | A1 * | 6/2004 | Miyazaki et al. | 713/176 |
| 2007/0064932 | A1 * | 3/2007 | Struik et al. | 380/30 |
| 2007/0154071 | A1 * | 7/2007 | Lin et al. | 382/119 |
| 2007/0177773 | A1 * | 8/2007 | Hu et al. | 382/119 |
| 2008/0256362 | A1 * | 10/2008 | Takenaka et al. | 713/180 |

* cited by examiner

*Primary Examiner* — Kambiz Zand
*Assistant Examiner* — Sharif E Ullah
(74) *Attorney, Agent, or Firm* — Lawrence J. Bassuk; Frederick J. Telecky, Jr.

(57) ABSTRACT

Embodiments provide systems and methods to optimize signature verification time for a cryptographic cache. Time is reduced by eliminating at least some of the duplicative application of cryptographic primitives. In some embodiments, systems and methods for signature verification comprise obtaining a signature which was previously generated using an asymmetrical cryptographic scheme, and determining whether an identical signature has previously been stored in a signature cache. If an identical signature has been previously stored in the signature cache, retrieving previously generated results corresponding to the previously stored identical signature, the results a consequence of application of cryptographic primitives of the asymmetrical cryptographic scheme corresponding to the identical signature. The results are forwarded to a signature verifier. In at least some embodiments, at least one of these functions occurs in a secure execution environment.

1 Claim, 3 Drawing Sheets

VERIFYING CRYPTOGRAPHIC SIGNATURE FROM STORED PRIMITIVES OF PREVIOUSLY RECEIVED SIGNATURE

CROSS-REFERENCE TO RELATED APPLICATION(S)

The present application claims priority to European provisional patent application Serial No. 08290175.2, filed Feb. 26, 2008, and entitled "Cryptographic Cache" hereby incorporated in its entirety herein by reference.

BACKGROUND

Computer system security is an increasingly important issue in the computer industry. Computer system users are rightfully concerned about the security of electronically stored information from unauthorized access, and especially for sensitive and valuable business information. Malicious attacks by computer viruses and unauthorized access to computer networks, for example, cause disruption of computer networks and can cause destruction of data or loss of secrecy to such data. Moreover, the computer systems themselves can be compromised by electronic vandalism, so as to be temporarily or permanently disabled.

Various encryption schemes have been developed to improve the security of computer systems. Such encryption schemes employ cryptographic primitives to increase reliability. However, use of cryptographic primitives is time-consuming, especially schemes employing asymmetric cryptographic primitives, e.g., based on (RSA) or on elliptic curve cryptosystems (ECC), etc. Nevertheless, use of asymmetric cryptographic schemes—especially ECC—is growing in popularity; as at least one reason, an ECC key length is shorter than an RSA key length for an equivalent security level. Despite this, the signature verification by various cryptographic schemes, including for example, the elliptic curve digital signature algorithm (ECDSA), remains particularly time-consuming; in fact, ECDSA, for example, is up to twenty (20) times slower than the signature verification process of RSA. Such delay is problematic, particularly when authentication time is critical, such as for example, during secure boot or during loading of signed applications.

BRIEF DESCRIPTION OF THE DRAWINGS

For a detailed description of exemplary embodiments of the invention, reference will be made to the accompanying drawings in which.

NOTATION AND NOMENCLATURE

Figure 1:
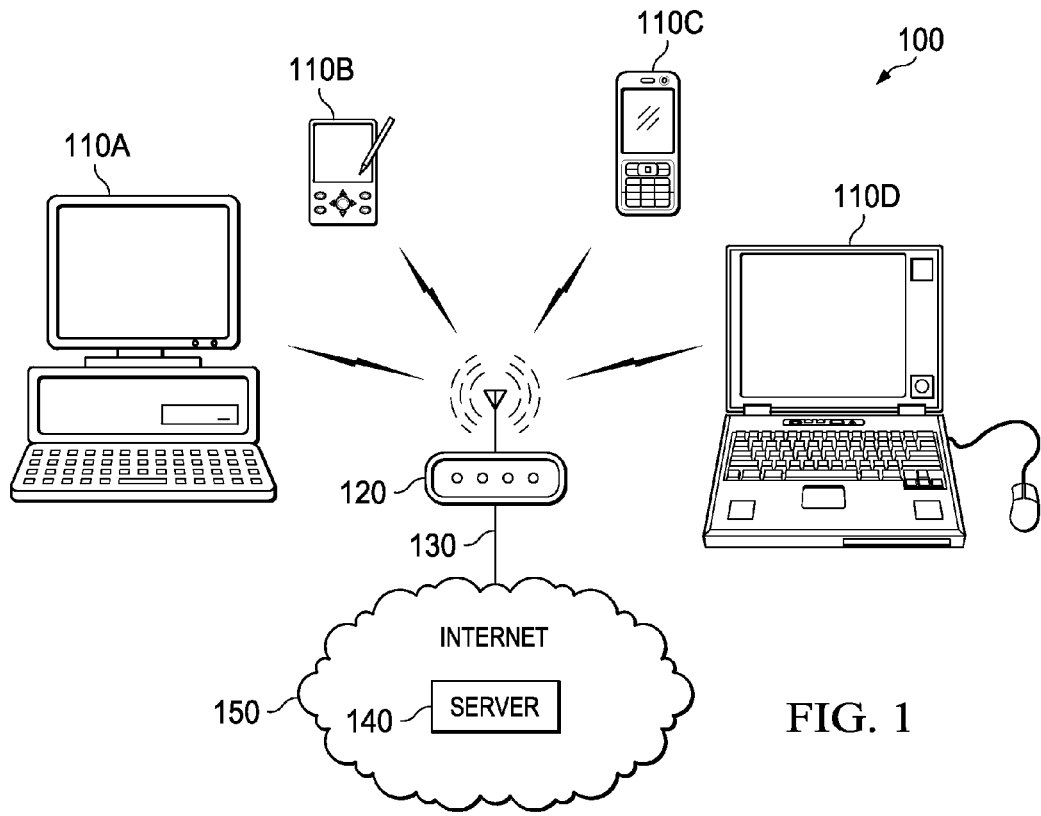
FIG. 1 illustrates an example network with a transmitter and a plurality of example receivers, in which embodiments may be used to advantage.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

It should be understood at the outset that although exemplary implementations of embodiments of the disclosure are illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present invention may be employed in a wide variety of devices and computer networks to optimize the speed of signature verification, and reduce the computational requirements needed for signature verification. For example, and not by way of limitation, embodiments may be implemented in mobile phones, laptops, personal digital assistants (PDAs), audio devices, microprocessors, mobile game devices, and much more, in fact any device storing information in unsecured memory that requires something to be verified before the device takes further action. Of course, it should be appreciated that embodiments are not limited to wireless devices, but may instead—or additionally—be implemented in wired devices.

To better appreciate present embodiments, it should be first understood that digital signature schemes use what is known as "public key cryptography," which employs an algorithm using two different albeit mathematically related "keys": 1) a private key, which is known only to the signer (also referred to herein as a transmitter or a sender) and used to create the digital signature, and 2) a public key, which is used by a receiving party to verify the digital signature created by the sender/signer. A computer system (hardware, software, firmware and/or a combination thereof) utilizing at least one of these keys may be referred to as an asymmetric cryptosystem, or a system employing asymmetric cryptography. When there are numerous potential receivers, the public key must be available to all of them; in some embodiments the public key is made available by publication in an on-line repository or directory for easy access.

To digitally sign a document, application, code, data or any other item of information (hereinafter generically referred to as a "message"), a signer employs any of a variety of cryptographic hash function to compute a relatively unique hash result of the original message. The hash result is transformed into a digital signature using the signer's private key. The resulting digital signature is thus unique to both the message and the private key used to create it. The digital signature, i.e., the digitally signed hash result of the original message, is "attached" or "affixed" to its associated original message; both the digital signature and the original message are subsequently stored or transmitted. However, the digital signature may also be sent or stored as a separate data element, so long as it maintains a reliable association with its message.

Every time a message is received (or retrieved, depending upon embodiment), the digital signature is verified. Verification of a digital signature is accomplished by employing cryptographic primitives to determine whether the digital signature was created using the corresponding private key and computing a new hash result of the original message using the same hash function employed to create the digital signature. This hash value is then compared with the hash result extracted from the signed hash value portion of the digital signature to check whether the message has been altered during transmission. Any change in the message will invalidate the corresponding digital signature.

Thus, using the public key and the new hash result, the security logic of a receiving device or system verifies whether: (1) the digital signature was created using the corresponding private key; and (2) the newly computed hash result matches the original hash result which was transformed into the digital signature during the signing process. (It will be assumed, for the sake of discussion herein, that the recipient properly has access to the sender's public key.)

As noted, every time a message is received (or retrieved, depending upon embodiment), the digital signature is verified. This poses a serious computation burden on any device/system which must repeatedly (e.g., hourly, daily, etc.) access, for example, a signed application stored in unsecure memory.

In light of the foregoing, embodiments of the invention provide systems and methods for optimizing the speed with which a recipient can authenticate a sender by verifying a received digital signature, which systems and methods are particularly useful in connection with asymmetric decryption activities. Since repetitive generation of known signatures is unnecessary, as well as extremely time- and resource-intensive, embodiments implement a signature library for generated signatures. At least one resulting advantage: implementing embodiments result in significant speed performance improvement, with a particularly noticeable improvement during routines such as secure boot and during authentication of signed applications. Additionally, success of embodiments is independent of the size of the key used by the cryptographic primitive. Moreover, embodiments noticeably improve device performance speed, including for those devices with limited computational resources, for example and not by way of limitation, in single in-line memory modules (SIMMs), etc.

FIG. 1 illustrates an example wireless local area network (WLAN) 100 with a plurality of receiving devices 110, each able to receive (or retrieve) at least one encrypted message and a sender/transmitter 120, according to embodiments. It should be appreciated that the network of FIG. 1 is meant to be illustrative and not meant to be exhaustive; for example, it should be appreciated that more, different or fewer systems, devices and/or paths may be found in any given network. It should be further appreciated that, depending upon embodiments, sender/transmitter 120 is able to send an identical encrypted message to one or more receiving devices 110, is able to send a separate (different) encrypted message to different devices, is able to send an encrypted message to a repository (e.g., server 140) accessible by one or more receiving devices 110, and/or is able to store an encrypted message onboard transmitter 120 for access by one or more receiving devices 110.

The exemplary network 100 comprises sender 120 and any of a variety of fixed-location and/or mobile wireless devices, four of which are respectively designated in FIG. 1 with reference numerals 110A, 110B, 110C and 110D. Exemplary receiving computing devices 110 include, but are not limited to, any variety of personal computer (PC) 110A (in some cases with wireless communication capabilities), a personal digital assistant (PDA) 110B, an MP3 player, a wireless telephone 110C (e.g., a cellular phone, a Voice over Internet Protocol (VoIP) telephonic functionality, a smart phone, etc.), and a laptop computer 110D, etc. At least one of sender 120 and devices 110A-D may be implemented in accordance with at least one wired and/or wireless communication standard (e.g., from the IEEE 802.11 family of standards). Further, at least one device 110 may comprise a plurality of co-existing different wireless network technology subsystems onboard, e.g., in at least some embodiments, device 110 implements communication via a WLAN network and a BT network. Of course, in other embodiments device 110 may implement communication via any combination of, but are not limited to, such subsystems as worldwide interoperability for microwave access (WiMAX) networks, wireless local area network (WLAN) networks, long term evolution (LTE) mobile telephony networks, personal area networks (PANs), wireless universal serial bus (USB) networks, BLUETOOTH (BT) networks, etc.

In the example of FIG. 1, to enable the plurality of devices 110A-D to communicate with devices and/or servers located outside example network 100, transmitter 120 is communicatively coupled via any of a variety of communication paths 130 to, for example, any of a variety of servers 140 associated with public and/or private network(s) such as the Internet 150. Server 140 may be used to provide, receive and/or deliver, for example, any variety of data, video, audio, telephone, gaming, Internet, messaging, electronic mail, etc. service. Additionally or alternatively, network 100 may be communicatively coupled to any of a variety of public, private and/or enterprise communication network(s), computer(s), workstation(s) and/or server(s) to provide any of a variety of voice service(s), data service(s) and/or communication service(s).

Figure 2:
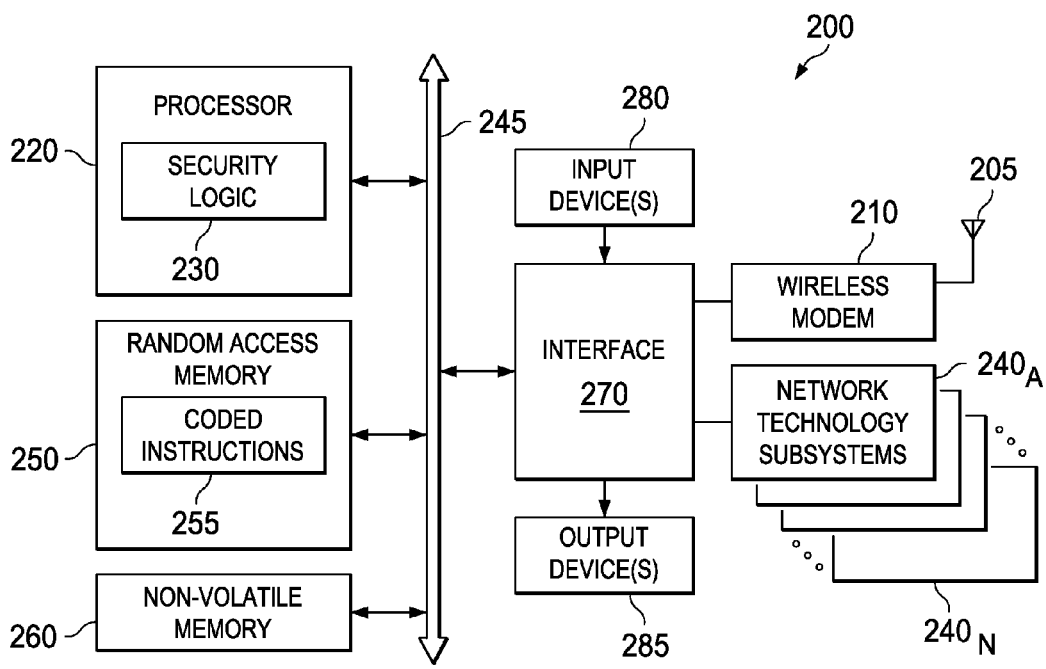
FIG. 2 illustrates an exemplary device, according to embodiments.

The systems and methods described herein may be implemented on any general-purpose computer with sufficient processing power, memory resources, and network throughput capability to handle the necessary workload placed upon it. FIG. 2 illustrates an exemplary, general-purpose computer system suitable for implementing at least one embodiment of a device in which secure transmissions may be received or by which secure transmissions may be retrieved. It should be expressly understood that device 200 may be a transmitter, a receiver, or both. It should further be expressly understood that any device may at times be a transmitter and at other times be a receiver.

Exemplary device 200 comprises at least one of any of a variety of radio frequency (RF) antennas 205 and any of a variety of wireless modems 210 that support wireless signals, wireless protocols and/or wireless communications (e.g., according to IEEE 802.11n). RF antenna 305 and wireless modem 210 are able to receive, demodulate and decode WLAN signals transmitted to and/or within a wireless network. Likewise, wireless modem 210 and RF antenna 205 are able to encode, modulate and transmit wireless signals from device 200 to and/or within a wireless network. Thus, RF antenna 205 and wireless modem 210 collectively implement the "physical layer" (PHY) for device 200. It should be appreciated that device 200 is communicatively coupled to at least one other device and/or network (e.g., a local area network (LAN), the Internet 150, etc.). It should further be understood that illustrated antenna 205 represents one or more antennas, while the illustrated wireless modem 210 represents one or more wireless modems. It should be understood that some embodiments of subsystems 240 may have their own dedicated wireless modem and antenna, while other embodiments may share either or both of a wireless modem and antenna. Again, device 200 is strictly exemplary; in some embodiments, the respective device 200 is wired.

Exemplary device 200 further comprises processor(s) 220. It should be appreciated that processor 220 may be at least one of a variety of processors such as, for example, a microprocessor, a microcontroller, a central processor unit (CPU), a main processing unit (MPU), an advanced reduced instruction set computing (RISC) machine (ARM) processor, a digital signal processor (DSP), etc. In at least one embodiment, processor 220 is an Open Multimedia Application Platform (OMAP®) dual-core processor available from Texas Instruments Incorporated, which combines a TMS320C55x™ digital signal processor core and an enhanced Advanced RISC Machine (ARM) 925 processor. Other conventional microprocessors can, of course, also serve as processor(s) 220.

In the exemplary device of FIG. 2, processor 220 implements security logic 230 for vetting of digitally signed applications, data, messages, etc. which device 200 is to use to perform one or more of its intended functions. Processor 220 executes coded instructions 255 which may be present in a main memory of the processor 220 (e.g., within a random-access memory (RAM) 250) and/or within an on-board memory of the processor 220). Of course, it should be appreciated that coded instructions 255 may be present in other memory within or accessible by device 200, e.g., in NVM 260, etc. Processor 220 communicates with memory (including RAM 250 and non-volatile memory (NVM) 260) via bus 245. It should be appreciated that bus 245 may in turn comprise more than one bus, depending upon system architecture. RAM 250 may be implemented by dynamic RAM (DRAM), static RAM (SRAM), synchronous dynamic RAM (SDRAM), and/or any other type of RAM device. Non-volatile memory 260 may be implemented as read-only memory (ROM), or mask-programmable or electrically-alterable such as flash electrically erasable programmable ROM (EEPROM, as persistent SRAM, as a disk storage device, or a combination of these and other implementations of non-volatile data storage.

Processor 220 implements embodiments using one or more of any of a variety of software, firmware, processing thread(s) and/or subroutine(s). For example, embodiments may be implemented executing one or more of a variety of software, firmware, processing thread(s) and/or subroutine(s) with the example processor 220; further, aspects of embodiments may be, additionally or alternatively, implemented by hardware, software, firmware or a combination thereof, including using an application specific integrated circuit (ASIC), a programmable logic device (PLD), a field programmable logic device (FPLD), discrete logic, etc.

Device 200 also preferably comprises at least one input device 280 (e.g., keyboard, touchpad, buttons, keypad, switches, dials, mouse, track-ball, voice recognizer, card reader, paper tape reader, etc.) and at least one output device 285 (e.g., liquid crystal display (LCD), printer, video monitor, touch screen display, a light-emitting diode (LED), etc.)—each of which are communicatively connected to interface 270.

Interface 270, additionally or alternatively, communicatively couples wireless modem 210 with processor 220. Interface 270 enables interface to, for example and not by way of limitation, Ethernet cards, universal serial bus (USB), token ring cards, fiber distributed data interface (FDDI) cards, network interface cards, wireless local area network (WLAN) cards, etc. to enable device 200 to communicate with other devices and/or communicate via Internet 150 or at least one intranet. With such a network connection, it is contemplated that processor(s) 220 would be able to receive information from at least one type of network technology, and/or output information to at least one type of network technology in the course of performing the herein-described processes. It should be appreciated that interface 270 implements at least one of a variety of interfaces, such as an external memory interface, serial port, communication internal to device 200, general purpose input/output, etc. Some embodiments of device 200 comprise at least two wireless network technology subsystems 240. FIG. 2 illustrates network technology subsystems $240_A$-$240_N$, where N=the number network technology subsystems in device 200.

Figure 3:
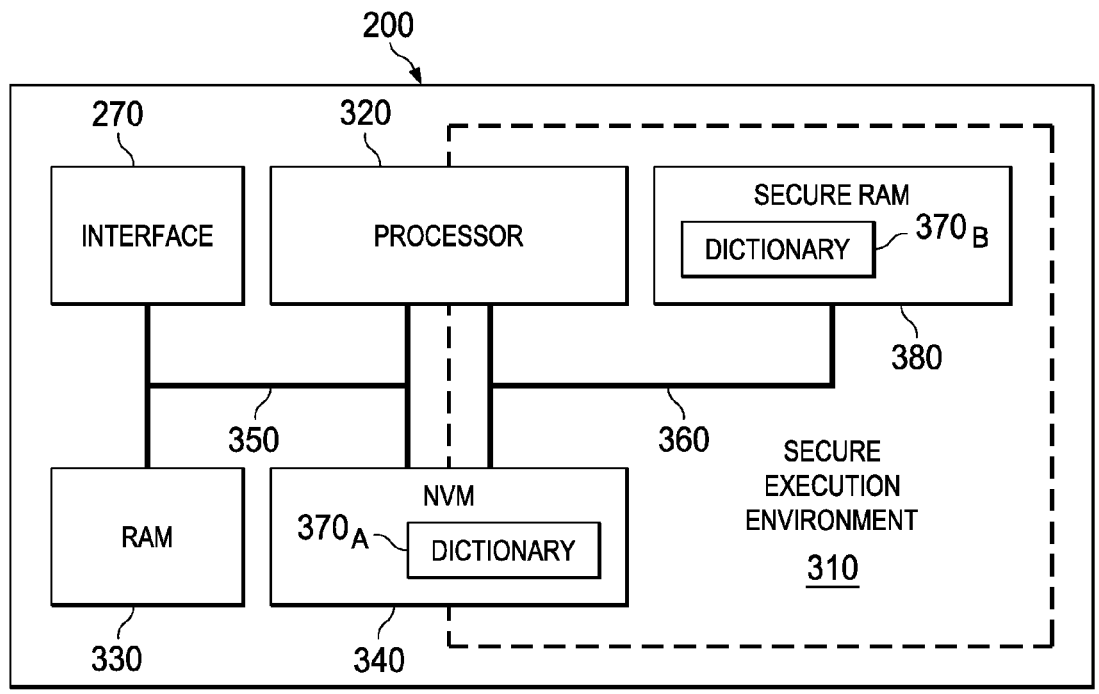
FIG. 3 illustrates an exemplary device, in which embodiments may be implemented to advantage.

Another way of looking at device 200 is illustrated in FIG. 3. Device 200 employs any of a variety of asymmetrical cryptographic schemes to secure at least one of its intended functions. While it should be appreciated that embodiments of device 200 may have additional or differently arranged components, the embodiment illustrated in FIG. 3 has been simplified for ease of understanding. As shown, device 200 comprises processor 320, public (or unsecure) RAM 330, NVM 340, interface 270, and a secure execution environment 310. A public bus 350 couples processor 320 to public RAM 330 and the public portion of NVM 340. Within the secure execution environment 310 is secure RAM 380. A secure bus 360 couples the NVM 340 and secure RAM 380. Public bus 350 and secure bus 360 are preferably physically separate from one another to prevent signals traversing secure bus 360 from being intercepted via public bus 350. Further, processor 320 and NVM 340 are illustrated as straddling the illustrated boundary of secure execution environment 310, because they are capable of operating both outside of secure execution environment 310 in a public mode and within secure execution environment 310 in a secure mode. Those skilled in the pertinent art are aware that a secure execution environment (which may be hardware-based) is designed to, at a minimum, authenticate programs and/or data before admitting them to run within the secure execution environment. A secure execution environment employs one or more authentication processes involving permissions and digital signatures to protect code execution, data storage, secret/private keys and applications that use such keys. Examples of a secure execution environment, without limitation, include an ARM TRUSTZONE® architecture, a trusted platform module (TPM), Texas Instruments' M-SHIELD™ security technology, etc.

In some embodiments, unsecure memory such as RAM 330 may be onboard the same device as secure execution environment 310, while in other embodiments, the unsecure memory is remote from the device that is executing the cryptographic primitives, in the illustrated example, remote from device 200. It should be appreciated that, in some embodiments, processor 320 comprises more than one processor—with one processor, for example a digital signal processor processing for the unsecure environment, while another processor, for example an ARM, processing for the secure environment.

In at least some embodiments, memory will comprise dictionary $370_A$ for the different authentications that happen during the life of a device. At least some such embodiments would employ non-volatile memory (NVM), such as a secure portion of NVM 340, as the storage area for the dictionary. In other embodiments, memory will comprise a dictionary for the different authentications that happen only during the period of time the device is powered up. At least some such embodiments would preferably employ secure random access memory (RAM) 380 as the storage area for dictionary $370_B$. Dictionary 370 (regardless of which memory it is stored in, or the location of the memory) may alternatively be referred to herein as cache 370 or signature cache 460.

Figure 4:
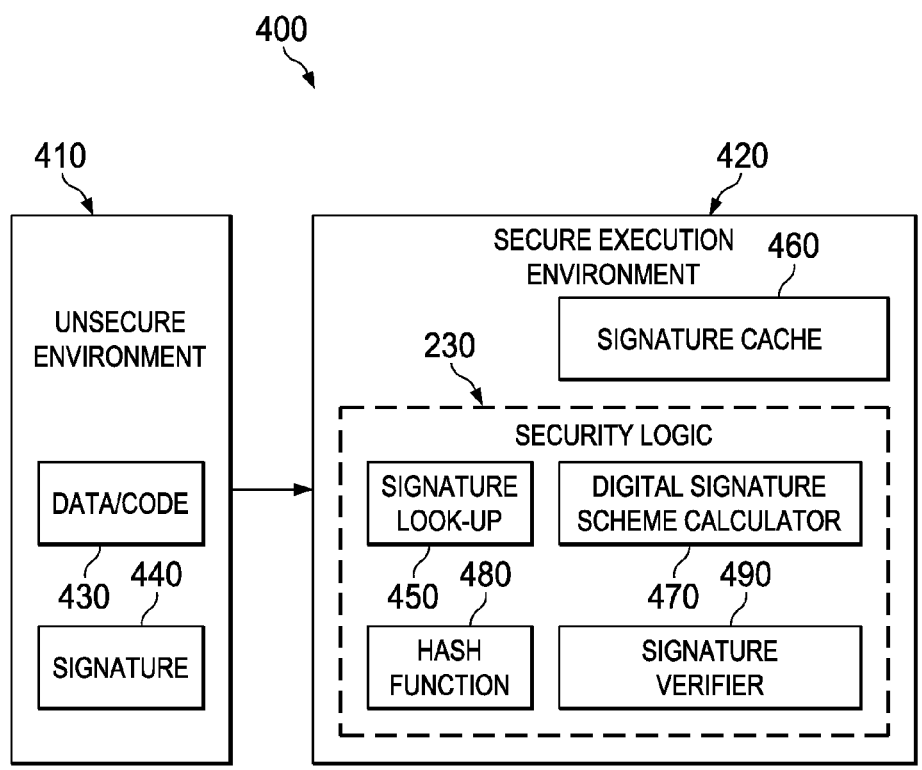
FIG. 4 illustrates a block diagram of an exemplary cryptosystem, according to embodiments.

FIG. 4 illustrates a block diagram of an exemplary cryptosystem, according to embodiments. Cryptosystem 400 comprises an unsecure environment 410 and a secure environment 420. Although unsecure environment 410 and secure environment 420 will be discussed in this example as if they are both onboard the same device, embodiments should not be so limited. Embodiments may include a remote repository containing unsecure environment 410 for device(s) 200 bearing respective secure environment(s) to access when a particular signed application is sought. Unsecure environment 410 comprises data/code 430 (also referred to herein as message 430 or signed application 430) and signature 440. It should be appreciated that signature 440 may be directly affixed to message 430, or is in some fashion trustworthily associated with message 430. For the present example, message 430 has been previously signed with signature 440 and both stored in unsecure environment 410 for subsequent access by device 200 as needed.

Preliminarily it should be noted it should be appreciated that embodiments should not be limited to the number of times a signed original message is accessed or obtained. Embodiments should also not be limited to whether the signed original message has just now been received by device 200 and stored briefly in an unsecure environment to be subsequently accessed by device 200 for signature verification, or whether the signed original message has been stored for some extended period of time in an unsecure environment—regardless of location—to be subsequently accessed by device 200 for signature verification.

Secure execution environment 420 comprises signature cache 460 and at least a portion of security logic 230. Security logic 230 in turn comprises signature look-up 450, calculator 470, hash function 480 and signature verifier 490, although it should be readily apparent that more or different functions and modules may form part of security 230 for some embodiments.

Device 200 obtains signature 440 (and message 430) from unsecure environment 410 and promptly presents them to security logic 230 for vetting. Embodiments employ signature look-up 450 to check signature cache 460 to determine whether the specific signature 440 has been presented before. If the specific signature 440 has indeed been previously presented, signature look-up 450 retrieves the corresponding results of the previous utilization of cryptographic primitives corresponding to the relevant digital signature scheme being employed, which results were previously stored at the identified location in signature cache 460, and forwards the results to signature verifier 490. Among those results is the hash value of the previous message that is part of the previous signature. Signature verifier 490 calls hash function 480 to perform a hash on newly obtained message 430, and compares the hash value of the newly obtained message 430 with the hash value retrieved from signature cache 460. If there is a match, the signature is verified and the message is forwarded for further processing, e.g., uploading into NVM or RAM as the case may be, etc.

If, however, the specific signature 440 has not been previously presented, signature look-up 450 passes signature 440 to calculator 470 to apply the cryptographic primitives corresponding to the relevant digital signature scheme being employed between device 200 and the original message's signer. Upon completion of the analysis, the results are copied into signature cache 460 as a new entry. The results are also forwarded to signature verifier 490. As before, signature verifier 490 calls hash function 480 to perform a hash on newly obtained message 430, and compares the hash value resulting from calculator 470's analysis with the hash value of the newly obtained message 430. If there is a match, the signature is verified and the message is forwarded for further processing, e.g., uploading into NVM or RAM as the case may be, etc. If there is not a match, the signature is not verified. As a result, and depending upon the particular embodiment, the corresponding message is deleted, stored in unsecure memory for further processing, or other action taken because the message's bona fides have been called into question.

Examples of digital signature schemes which may take advantage of embodiments include, but are not limited to: Digital Signature Algorithm (DSA), Elliptic Curve DSA (ECDSA), signature schemes based on RSA cryptosystem (for example: RSA-PSS, RSA-PKCS#1 1.5), Diffie-Hellman protocol, Pointcheval-Stern signature algorithm, Rabin signature algorithm, ElGamal signature scheme, Schnorr signature, Merkle-Hellman knapsack algorithm, etc. Various asymmetric cryptosystems create and verify digital signatures using different algorithms and procedures, but any cryptographic scheme now known or developed in the future could take advantage of the inventive teachings disclosed and suggested herein.

Figure 5:
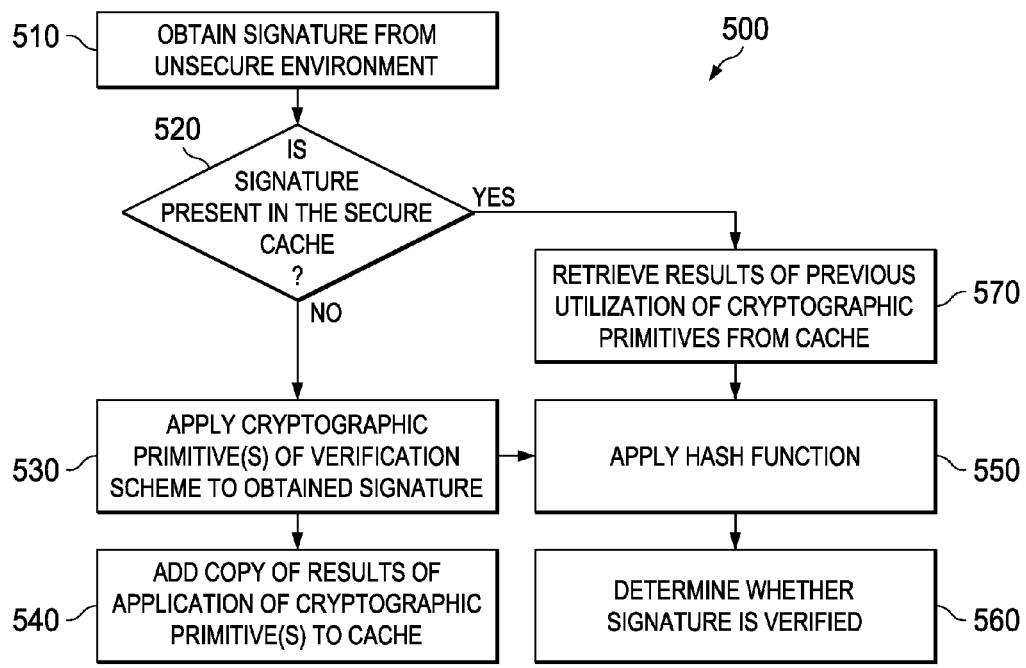
FIG. 5 illustrates an exemplary method for signature verification, according to embodiments.

FIG. 5 illustrates an exemplary process 500 for optimizing latency during cryptographic signature verification. Consider now the scenario of vetting a signed application such as might be used for a secure boot. The application and its respective signature are retrieved from an unsecure storage to be loaded. However, prior to loading, the application must be checked or vetted for any changes or modifications which may have occurred. It is irrelevant to the present discussion whether the changes or modifications to the application were authorized (e.g., made for improved performance, etc.) or unauthorized (e.g., malicious attack on the system). To determine whether the application has been changed in any way, the corresponding stored digital signature must be verified.

At block 510, device 200 obtains at least signature 440 from memory in unsecure environment 410. In some embodiments, device 200 will also obtain the message at this time. Device 200 presents signature 440 to signature look-up 450 to in turn determine whether a signature that is identical to presented signature 440 is found in the secure signature cache 460 (block 520). If no identical signature is found in cache 460, signature look-up 450 simply forwards presented signature 440 to digital signature scheme calculator 470. Digital signature scheme calculator 470 applies the appropriate cryptographic primitive(s) of the digital signature verification scheme agreed to be employed on messages between signer and device 200; the primitive(s) are applied to obtained signature 440 (block 530). Digital signature scheme calculator 470 adds a copy of the results of application of the appropriate cryptographic primitive(s) as a new entry to cache 460 (block 540). This will enable signature look-up 450 to quickly locate this newly analyzed signature, should it ever be subsequently presented.

Digital signature scheme calculator 470 also forwards the results of its analysis to signature verifier 490. Signature verifier 490 calls hash function 480 and applies hash function 480 (block 550) to perform a hash on newly obtained message 430. Signature verifier 490 determines whether to verify signature 440 (block 560) by comparing the hash value resulting from digital signature scheme calculator 470's analysis with the hash value generated by hash function on newly obtained message 430. If there is a match, the signature is verified and the message is forwarded for further processing, e.g., uploading into NVM or RAM as the case may be, etc. If there is not a match, the signature verification fails.

However, if an identical signature is located in signature cache 460, because signature 440 has been previously presented for verification, signature look-up 450 retrieves the stored results of the previous utilization of cryptographic primitives corresponding to the relevant digital signature scheme being employed (block 570), which results were previously stored at the identified location in signature cache 460, and forwards the results to signature verifier 490. Among those results retrieved from signature cache 460 is the hash value of the previous message that is part of the previous signature. Signature verifier 490 calls hash function 480 to perform a hash on newly obtained message 430 (block 550), and determines whether to verify signature 440 (block 560) by comparing the hash value of message 430 generated by hash function 480 with the hash value retrieved from signature cache 460. If there is a match, the signature is verified and the message is forwarded for further processing, e.g., uploading into NVM or RAM as the case may be, etc. If there is not a match, the signature verification fails.

Thus, by simply retrieving the results of the previous analysis of the identical signature, significant savings in computational resources and performance speed are achieved.

It should be appreciated that although exemplary process 500 was considered in the context of signed application(s), embodiments are not so limited. For example, if the incoming "message" instead were data, a communication, etc., as long as the signature affixed to or otherwise associated with the message has been previously analyzed by device 200 (e.g., using cryptographic primitives corresponding to the respective digital signature scheme being employed between signer and receiver), then embodiments will retrieve the result(s) of the cryptographic primitive(s) from the cache and forward same for verification with respect to the obtained message.

It should further be appreciated that although exemplary process 500 considered the scenario of a signed application stored for subsequent use, that embodiments are not so limited. For example, if an incoming "message"—perhaps in the form of a token containing an identical message, is sent from the same sender using the same private key to encrypt and having the same public key, the signature may have previously been verified. In such an exemplary scenario, embodiments would locate the previous signature, retrieve the result(s) of the cryptographic primitive from the cache and forward same for verification with respect to the message (token). As another example, at least one of the results could be preloaded into the signature cache 460, in advance of receiving an incoming signature 440 for the first time, to thereby speed up the verification of that signature when subsequently received/retrieved. In such a case, the preloaded result(s) could be computed on the basis of the known public key and/or any additional information the sender may have provided to the receiver. Thus, the speed of the verification improves at least because fewer computational resources are needed.

Signature cache 460, in at least some embodiments, will be further internally organized so that the stored signatures most often accessed, are kept in a faster memory to achieve improvement in performance speed, while the stored signatures less often used, are kept in a slower memory accessed after the smaller faster memory is accessed.

The use of cryptographic primitives—although solidly dependable—is time-consuming and computational resource-consuming. Embodiments overcome much of this waste of time and computational resources by rationally eliminating unnecessary duplicative verification processing. Simply, when a signed application is received/retrieved, the application and its respective signature are brought into the secure execution environment to be vetted. First, embodiments ascertain whether the signature has been verified before; this is likely in connection with many signed applications, particularly those used on a regular basis. If the signature has not been verified before—because this is the first boot, or the first time the signed application has been requested—then embodiments forward the signature for normal processing by the predetermined onboard signature verification scheme. However, if the signature is present in the cache—indicating that this application has been retrieved or accessed on a prior occasion—then the result of the previous utilization of the relevant cryptographic primitive is retrieved and passed to a signature validator. As a result, repetition of an unnecessary the cryptographic computation is avoided thereby reducing authentication latency. Assuming the signature is deemed valid, the corresponding application is loaded, and processing continues. Of course, if the signature is deemed invalid, the application is not loaded, and an error preferably indicated to an operator.

Many modifications and other embodiments of the invention will come to mind to one skilled in the art to which this invention pertains having the benefit of the teachings presented in the foregoing descriptions, and the associated drawings. For example, in some embodiments, further cryptographic encryption and/or confidentiality primitives (e.g., symmetric encryption/decryption, use of message authentication code (MAC), storing the secret key separately, etc.) may be used if the cryptographic cache, and in some embodiments the signature look-up, are stored in an unsecured environment.

Therefore, the above discussion is meant to be illustrative of the principles and various embodiments of the disclosure; it is to be understood that the invention is not to be limited to the specific embodiments disclosed. Although specific terms are employed herein, they are used in a generic and descriptive sense only and not for purposes of limitation. It is intended that the following claims be interpreted to embrace all such variations and modifications.

What is claimed is:

1. A process of operating a computer system comprising:
A. receiving a cryptographic signature in a memory in an unsecure environment of the computer system;
B. determining whether the received cryptographic signature is identical to a previously received signature, which is stored in a signature cache in a secure execution environment of the computer system;
C. if no identical previously received signature is located in the signature cache,
   i. applying, in the secure execution environment, cryptographic primitives of the digital signature verification scheme agreed to be employed on messages between signer to the received cryptographic signature in a digital signature scheme calculator in the secure execution environment, and
   ii. adding a copy of the results of application of the appropriate cryptographic primitives as a new entry to the signature cache; and D. if an identical previously received signature is located in the signature cache,
   i. retrieving, in the secure execution environment, the stored results of the previous utilization of cryptographic primitives corresponding to the relevant digital signature scheme being employed, which results were previously stored at an identified location in the signature cache,
   ii. applying a hash value to the cryptographic signature,
   iii. comparing a hash value of the cryptographic signature generated by a hash function with a hash value retrieved from the signature cache, and
   iv. if there is a match, verifying the cryptographic signature and any message accompanying the cryptographic signature.

* * * * *